United States Patent [19]

Baumann et al.

[11] Patent Number: 5,932,687
[45] Date of Patent: Aug. 3, 1999

[54] PREPARATION OF PRECIPITATED POLYAMIDE POWDERS OF NARROW PARTICLE SIZE DISTRIBUTION AND LOW POROSITY

[75] Inventors: Franz-Erich Baumann, Duelmen; Norbert Wilczok, Muelheim, both of Germany

[73] Assignee: Huels Aktiengesellschaft, Marl, Germany

[21] Appl. No.: 09/025,127

[22] Filed: Feb. 17, 1998

[30] Foreign Application Priority Data

Mar. 5, 1997 [DE] Germany .......................... 197 08 946

[51] Int. Cl.[6] .................................................. C08G 69/08
[52] U.S. Cl. ......................... 528/313; 525/427; 525/432; 525/934
[58] Field of Search ..................................... 525/427, 432, 525/934; 528/313

[56] References Cited

U.S. PATENT DOCUMENTS

| | | | |
|---|---|---|---|
| 3,900,607 | 8/1975 | Müller et al. | 528/313 |
| 3,927,141 | 12/1975 | Feldmann et al. | 528/313 |
| 3,966,838 | 6/1976 | Feldmann et al. | 528/313 |
| 4,143,025 | 3/1979 | Feldmann et al. | 528/313 |
| 4,195,162 | 3/1980 | Feldmann et al. | 528/313 |
| 4,273,919 | 6/1981 | Feldmann et al. | 528/313 |
| 4,334,056 | 6/1982 | Meyer et al. | 528/496 |
| 4,687,837 | 8/1987 | Mumcu | 528/496 |

*Primary Examiner*—Terressa Mosley
*Attorney, Agent, or Firm*—Oblon, Spivak, McClelland, Maier & Neustadt, P.C.

[57] ABSTRACT

Certain applications require polyamide powders of narrow particle size distribution and low porosity.

The precipitation process of the invention incorporating a prior nucleation phase provides the desired products.

13 Claims, No Drawings

5,932,687

PREPARATION OF PRECIPITATED POLYAMIDE POWDERS OF NARROW PARTICLE SIZE DISTRIBUTION AND LOW POROSITY

BACKGROUND OF THE INVENTION

1. Field of the Invention

The present invention relates to provide a process for preparing precipitated polyamide powders of highly uniform particle size and low porosity.

2. Discussion of the Background

Polyamide-based coating powders are notable for their high chemical resistance and very good mechanical properties. Among such powders, those obtained by precipitation from ethanolic solution, in accordance, for example, with DE-A 29 06 647, are superior in terms of their processing properties, to those products obtained from a grinding process, in accordance, for example, with DE-A 15 70 392, since precipitation leads to rounder and thus better fluidizable particles. Milled powders as obtained, for example, in accordance with DE-C 28 55 920 possess, moreover, a broad particle size distribution, necessitating a great classification effort. A further advantage of the precipitated powders is the wide scope for variation of the molecular weight ($\eta_{rel}$=1.5 to 2.0), whereas milled powders can only be prepared economically at an $\eta_{rel}$<1.7.

The process of precipitation in its known form, from alcoholic solutions under pressure, is at its technical limits when it is to be used to prepare compact powders having a low porosity as expressed by their BET surface areas. This applies in particular to fine powders having a particle fraction <100 µm of more than 90%, especially when the fraction d<32 µm, which is responsible for dusting, is difficult to separate off by sieving and screening: this fraction is less in evidence with coarser precipitated powder. If powders having an upper particle size limit of 63 µm, in some cases even <40 µm, are required, they have to be separated off in one or more classifying steps from the precipitated and dried crude powder. The fine fraction <32 µm which is present in the crude powder limits the yield of useful particles in the case of fine powders.

Although it is possible in accordance with DE-A 35 10 689 to obtain fine powders with a highly uniform particle size by using low dissolution temperatures, these products are normally characterized by low bulk densities and high BET surface areas, and therefore do not flow as well. Moreover, the powders are to have a low porosity, as determined by their BET surface area. According to DE-A 44 21 454, precipitated polyamide powders with narrow particle size distributions and low porosity can be prepared. With this process, however, very fine polyamide powders are obtained by a subsequent grinding process. Coarser powders, as are employed for fluidized sinter coating, are to include a high fraction between 60 and 150 µm; in these cases not only the dust fraction but also coarse particles >250 µm have to be separated off by sieving.

There is therefore a need for a modified precipitation process which provides compact powders having a relatively narrow particle size distribution, so that, preferably, classification becomes unnecessary or, at least, it is possible to obtain an increased yield in the course of classification by sieving or screening. Moreover, the powders should have a low porosity as determined by their BET surface areas.

This object has surprisingly been achieved in accordance with the patent claims.

SUMMARY OF THE INVENTION

The process of the invention permits the precipitation of a homopolyamide or of a copolyamide of uniform composition from ethanolic solution, under pressure, to form a compact powder whose bulk density exceeds that of the products of DE-A 35 10 689 for a comparable particle size distribution. The dissolution temperatures for the polyamide of from 130 to 165° C., preferably from 135 to 155° C., even more preferably from 140 to 155° C., and a cooling rate of $\leq$25 ° C./h, more preferably $\leq$10 ° C./h, known from DE-A 35 10 690, are likewise established; in each specific case it is possible by means of preliminary experiments to determine the dissolution temperatures required for the respective polyamide and for the polyamide concentrations of $\geq$10 wt. %, preferably $\geq$15 wt. %, which are desirable and/or are to be aimed at in terms of a high space-time yield. Surprisingly, however, it has been found that polyamide powders with a relatively narrow particle size distribution are precipitated if the actual precipitation is preceded by a nucleation phase lasting from 10 to 120 minutes, preferably from 30 to 90 minutes, during which the PA solution remains optically clear and no exothermic crystallization is observed. For this purpose, the alcoholic solution is stirred throughout the abovementioned period at from 2 to 20 ° C., preferably from 5 to 15° C., above the subsequent precipitation temperature, isothermally, and the temperature is then lowered at the above cooling rates to the precipitation temperature, which should be kept as constant as possible. With a view to the target mean particle size, according to DE-A 35 10 691 high stirrer speeds are advantageous if the intention is to obtain low mean particle sizes. Suitable stirred vessels are known to the skilled worker. Blade stirrers are preferably employed.

DETAILED DESCRIPTION OF THE PREFERRED EMBODIMENTS

In principle, all partially crystalline polyamides can be employed for the precipitation; examples of particularly suitable polyamides are the addition polymers of lactams having a C atom number $\geq$10 and the polycondensates of the corresponding ω-amino carboxylic acids and also the polycondensates of aliphatic diamines and dicarboxylic acids each having $\geq$10 C atoms, and copolyamides of the abovementioned monomers. Preference is given to the use of hydrolytically polymerized PA 12.

Unregulated polyamides are just as suitable as regulated polyamides; their relative solution viscosity, measured in 0.5% strength solution in m-cresol in accordance with DIN 53 727, is from 1.4 to 2.0, preferably from 1.5 to 1.8.

The invention provides a process for preparing polyamide coating powders, which comprises precipitating a polyamide formed from lactams or from ω-amino carboxylic acids having at least 10 C atoms or from diamines and dicarboxylic acids each having at least 10 C atoms or copolyamides of these monomers by dissolving the polyamide in an aliphatic $C_{1-3}$ alcohol under pressure, lowering the temperature until nucleation takes place without precipitation, lowering the temperature further in a second stage until supersaturation results, and, following precipitation, drying the suspension.

The polyamide is dissolved in the alcohol, preferably ethanol, at from 130 to 165° C., preferably from 135 to 155° C. The precipitation is then carried out isothermally at from 100 to 130° C., preceded by a nucleation stage at from 2 to 20° C., preferably from 5 to 15° C., above the precipitation temperature. The temperature in the nucleation phase is held constant for from 10 minutes to 2 hours, preferably from 30 to 90 minutes. A particularly suitable polyamide is polylaurolactam.

By the process of the invention it is possible to prepare precipitated polyamide powders having an upper particle size limit of 100 µm, with a fraction of at least 90% below 90 µm, not more than 10% below 32 µm and a bulk density of more than 400 g/l and for a BET surface area of less than 10 m$^2$/g.

With the process of the invention it is possible to establish desired particle size distributions. Lower precipitation temperatures lead to coarser particles and low BET surface areas. As far as the nucleation temperature is concerned, decreasing values lead to lower BET surface areas and lower coarse fractions (D 0.9).

The breadth of the particle size distribution is affected in a nonlinear manner: below a limit value which is specific for each substance the differences D 0.9–D 0.1 decrease before becoming wider again after passing through an optimum. Together with the stirrer speed there are 3 degrees of freedom available for establishing the mean particle diameter, breadth and BET surface area.

According to the process of the invention, the preferred particle size distribution of the polyamide powders is D 0.9–D 0.1<60 µm, with particular preference <50 µm.

Without a nucleation phase the differences D 0.9–D 0.1 are more than 65 µm–70 µm in the case of PA 12.

The polyamide powders prepared in this way can be employed as an additive to coil coating materials. The polyamide powders of the type described can be used for coating metal by the electrostatic spraying technique or by the fluidized-bed sinter technique.

Additives known to the skilled worker (cf. DE-A 35 10 689, 35 10 690, 35 10 691), such as stabilizers, postcondensation catalysts or pigments, can be added actually during the dissolution stage, prior to the nucleation phase, or else to the suspension after precipitation.

During the nucleation and precipitation phase no additives should be added, since otherwise there is no guarantee of the isothermal temperature regime in both stages. Thermal inhomogeneities in the reactor should be avoided as far as possible in these two phases, since they are associated with a broader particle size distribution and the risk of premature precipitation at a high temperature, then leading to a very bulky powder with very high BET surface areas (over 15 to 20 m$^2$/g).

The drying of the ethanol suspension is carried out by the methods described, for example, in DE-A 35 10 689 or DE-A 35 10 690.

The crude powders are classified by means of sieving and in centrifugal air sifters.

The examples which follow are intended to illustrate the invention without restricting it in any way whatsoever. The particle size distributions are determined by sieving and light scattering in a laser beam (Malvern Mastersizer S/0-900 µm). The internal surface area is determined by the method of Brunauer-Emmett-Teller (BET), by nitrogen adsorption.

The following definitions are used:

$D_{0.1}$ in µm: Integral particle size distribution by laser diffraction at which 10% lie below the stated diameter $D_{0.5}$ in µm: ditto, at which 50% lie below the stated diameter $D_{0.9}$ in µm: ditto, at which 90% lie below the stated diameter Mean (value): Obtained from the volume distribution by laser diffraction Breadth: Difference between the $D_{0.9}$ and $D_{0.1}$ values of the integral distribution function.

EXAMPLES

Comparative Example 1: One-Stage Precipitation of Unregulated PA 12 According To DE-A 35 10 690

400 kg of unregulated PA 12, prepared by hydrolytic polymerization and having a relative solution viscosity of 1.62 and an end group content of 75 mmol/kg COOH and 69 mmol/kg NH$_2$, are brought to 145° C. together with 2,500 l of ethanol, denatured with 2-butanone and with a water content of 1%, over the course of 5 hours in a 3 m$^3$ stirred vessel (d=80 cm) and are stirred (blade stirrer, d=160 cm, speed=85 rpm) at this temperature for 1 hour. The jacket temperature is then reduced to 125° C. and the internal temperature is brought to 125° C. at a cooling rate of 25 ° C./h and at the same stirrer speed, with continuous removal of the ethanol by distillation. From that point on, with the same cooling rate, the jacket temperature is held from 2 to 3° C. below the internal temperature until precipitation begins at 109° C., which is evident from the evolution of heat. The rate of distillation is increased so that the internal temperature does not exceed 109.3° C. After 20 minutes the internal temperature falls, indicating the end of precipitation. Further distillation and cooling by way of the jacket are used to bring the temperature of the suspension to 45° C., and the suspension is then transferred to a paddle drier. The ethanol is distilled off at 70° C./500 mbar and the residue is subsequently dried at 20 mbar/86° C. for 3 hours.

Sieve analysis:

<32 µm: 8% by weight laser diffraction <30.5 µm:6.8%
<40 µm: 17% by weight
<50 µm: 26% by weight mean value D 0.5: 61 µm
<63 µm: 55% by weight
<80 µm: 92% by weight breadth D (0.9–0.1): 87 µm
<100 µm:100% by weight (0.9–0.1)

Bulk density: 433 g/l

Comparative Example 2: Single-Stage Precipitation of Regulated PA 12 according to DE-A 44 21 454

Example 1 is repeated using PA 12 granules obtained by hydrolytic LL polymerization in the presence of 1 part of dodecanedioic acid/100 parts LL: $\eta_{rel}$=1.60, [COOH]=132 mmol/kg, [NH$_2$]=5 mmol/kg.

With the exception of the stirrer speed (100 rpm) the solution, precipitation and drying conditions are those of Example 1.

Bulk density: 425 g/l

| Sieve analysis: | <32 µm: | 8% by weight |
| --- | --- | --- |
| | <40 µm: | 27% by weight |
| | <50 µm: | 61% by weight |
| | <63 µm: | 97% by weight |
| | <90 µm: | 100% by weight |

This powder is classified by sieving and screening into the following fractions:

| Coarse fraction: | <32 µm: | 2% by weight |
| --- | --- | --- |
| | <45 µm: | 10% by weight |
| | <63 µm: | 20% by weight |
| | <80 µm: | 80% by weight |
| | <90 µm: | 100% by weight |

| Fine fraction: | <32 µm: | 45% by weight |
| --- | --- | --- |
| | <40 µm: | 75% by weight |
| | <63 µm: | 92% by weight |
| | <80 µm: | 96% by weight |
| | <90 µm: | 100% by weight |

Comparative Examples 3 and 4

Example 2 is repeated with the same regulated PA 12 sample and with the following process parameters.

| Example | Stirrer speed rpm | Dissolution temperature °C. | Precipitation temperature °C. | Bulk density g/l | BET m²/g | Particle size distribution D 0.1/0.5/0.9 |
|---|---|---|---|---|---|---|
| 3 | 85 | 140 | 113 | 450 | 6.35 | 29/64/101 |
| 4 | 85 | 140 | 112 | 454 | 4.46 | 34/65/99 |

Comparative Example 5: Single-Stage Precipitation of PA 1010

In accordance with Example 1, 400 kg of a PA 1010 sample, obtained by polycondensation of 1,10-decanediamine and sebacic acid and having the following characteristics:

$\eta_{rel}$=1.84, [COOH]=62 mmol/kg, [NH$_2$]=55 mmol/kg are precipitated.

The precipitation conditions are modified relative to Example 1 as follows:
Precipitation temperature: 120° C., precipitation time: 2 hours, stirrer speed: 90 rpm
Bulk density: 417 g/l

| Sieve analysis: | <32 μm: | 6.0% by weight |
|---|---|---|
| | <45 μm: | 8.5% by weight |
| | <63 μm: | 23.5% by weight |
| | <100 μm: | 96.1% by weight |
| | <160 μm: | 99.7% by weight |
| | <200 μm: | 99.9% by weight |
| | <250 μm: | 100.0% by weight |

Comparative Example 6: Single-Stage Precipitation of PA 1012

In accordance with Example 1, 400 kg of a PA 1012 granular sample, obtained by polycondensation of 1,10-decanediamine and dodecanedioic acid and having the following characteristics: $\eta_{rel}$=1.76, [COOH]46 mmol/kg, [NH$_2$]=65 mmol/kg are precipitated.

The precipitation conditions are modified relative to Example 1 as follows:
Dissolution temperature: 155° C., precipitation temperature: 123° C., precipitation time: 40 minutes, stirrer speed: 110 rpm
Bulk density: 510 g/l

| Sieve analysis: | <32 μm: | 0.2% by weight |
|---|---|---|
| | <100 μm: | 44.0% by weight |
| | <250 μm: | 99.8% by weight |

Comparative Example 7: One-Stage Precipitation of PA 1012

Example 6 is repeated with the following changes:
Precipitation temperature: 125° C., precipitation time: 60 minutes
Bulk density: 480 g/l

| Sieve analysis: | <32 μm: | 0.1% by weight |
|---|---|---|
| | <100 μm: | 72.8% by weight |
| | <250 μm: | 99.7% by weight |

Comparative Example 8: Single-Stage Precipitation of PA 1012

Example 4 is repeated with the following changes:
Precipitation temperature: 128° C., precipitation time: 90 minutes
Bulk density: 320 g/l

| Sieve analysis: | <32 μm: | 0.5% by weight |
|---|---|---|
| | <100 μm: | 98.5% by weight |
| | <250 μm: | 99.6% by weight |

Comparative Example 9: Single-Stage Precipitation of PA 1212

In accordance with Example 1, 400 kg of a PA 1212 granular sample, obtained by polycondensation of 1,12-dodecanediamine and dodecanedioic acid and having the following characteristics: $\eta_{rel}$=1.80, [COOH]3 mmol/kg, [NH$_2$]=107 mmol/kg are precipitated.

The precipitation conditions are modified relative to Example 1 as follows:
Dissolution temperature: 155° C., precipitation temperature: 117° C., precipitation time: 60 minutes, stirrer speed: 110 rpm
Bulk density: 450 g/l

| Sieve analysis: | <32 μm: | 0.5% by weight |
|---|---|---|
| | <100 μm: | 54.0% by weight |
| | <250 μm: | 99.7% by weight |

Example 10: Two-Stage Precipitation of Unregulated PA 12 (According To The Invention)

400 kg of unregulated PA 12, prepared by hydrolytic polymerization and having a relative solution viscosity of 1.62 and an end group content of 75 mmol/kg COOH and 69 mmol/kg NH$_2$, are brought to 145° C. together with 2,500 l of ethanol, denatured with 2-butanone and with a water content of 1%, over the course of 5 hours in a 3 m³ stirred vessel (d=160 cm) and are stirred (blade stirrer, d=80 cm, speed=49 rpm) at this temperature for 1 hour. The jacket temperature is then reduced to 124° C. and the internal temperature is brought to 125° C. at a cooling rate of 25 ° C./h and at the same stirrer speed, with continuous removal of the ethanol by distillation. From that point on, with the same cooling rate, the jacket temperature is held from 1 to 3 ° C. below the internal temperature. The internal temperature is brought to 117° C. at the same cooling rate and is then held constant for 60 minutes. Distillation is subsequently continued at a cooling rate of 40 K/h and in this way the internal temperature is brought to 111° C. At this temperature precipitation begins, which is evident from the evolution of heat. The rate of distillation is increased so that the internal temperature does not exceed 111.3° C. After 25 minutes the internal temperature falls, indicating the end of precipitation. Further distillation and cooling by way of the jacket are used to bring the temperature of the suspension to 45° C., and the suspension is then transferred to a paddle drier. The ethanol is distilled off at 70° C./400 mbar and the residue is subsequently dried at 20 mbar/86° C. for 3 hours.

The powder properties are shown in Table 1.

Examples 11 to 13: Two-Stage Precipitation of Regulated PA 12

Example 10 is repeated with the stirrer speeds indicated in Tab. 1.

Examples 10 to 13 illustrate the higher bulk densities which can be obtained with a comparable particle size spectrum.

Examples 14 to 27: Two-Stage Precipitation of Regulated PA 12

Example 10 is repeated using PA 12 granules obtained by hydrolytic LL polymerization in the presence of 1 part of dodecanedioic acid/100 parts LL: $\eta_{rel}$=1.61, [COOH]=138 mmol/kg, [NH$_2$]=7 mmol/kg.

Stirrer speed, dissolution, nucleation and precipitation temperatures are shown in Tab. 2, along with the corresponding powder properties. These examples can be compared with Examples 2 to 4 and illustrate the more compact particle character—evident from the higher bulk density and the generally lower BET surface area -coupled with a narrower particle size distribution: Examples 14 and 15 illustrate the tendency of the particle size spectrum toward coarser particles with a very small BET surface area at lower precipitation temperatures. Examples 16 to 27 emphasize that the mean particle size and also the upper particle size limit fall, for the same precipitation temperatures, if the nucleation phase is inserted beforehand.

Example 28: Two-Stage Precipitation of PA 1010

In accordance with Example 10, 400 kg of a PA 1010 sample, obtained by polycondensation of 1,10-decanediamine and sebacic acid and having the following characteristics: $\eta_{rel}$=1.84, [COOH]=62 mmol/kg, [NH$_2$]=55 mmol/kg are precipitated.

The precipitation conditions are modified relative to Example 10 as follows:

Dissolution temperature: 155° C., nucleation temperature/time: 128° C./60 min
Precipitation temperature: 120° C., precipitation time: 1 hour, stirrer speed: 90 rpm
Bulk density: 440 g/l

| Sieve analysis: | <32 μm: | 4.2% by weight |
|---|---|---|
| | <63 μm: | 28.6% by weight |
| | <100 μm: | 86.1% by weight |
| | <160 μm: | 99.7% by weight |
| | <250 μm: | 100.0% by weight |

Example 29: Two-Stage Precipitation of PA 1012

In accordance with Example 10, 400 kg of a PA 1012 granular sample, obtained by polycondensation of 1,10-decanediamine and dodecanedioic acid and having the following characteristics: $\eta_{rel}$=1.76, [COOH]=46 mmol/kg, [NH$_2$]=65 mmol/kg are precipitated (as in Example 4).

The precipitation conditions are modified relative to Example 10 as follows:

Dissolution temperature: 155° C., nucleation temperature: 141 ° C., precipitation temperature: 123° C., precipitation time: 40 minutes, stirrer speed: 110 rpm Bulk density: 530 g/l

| Sieve analysis: | <32 μm: | 1.3% by weight |
|---|---|---|
| | <100 μm: | 34.1% by weight |
| | <250 μm: | 99.7% by weight |

Example 30: Two-Stage Precipitation of PA 1012

Example 29 is repeated with the following changes:

Nucleation time: 90 minutes

Bulk density: 530 g/l

| Sieve analysis: | <32 μm: | 0.8% by weight |
|---|---|---|
| | <100 μm: | 32.2% by weight |
| | <250 μm: | 99.8% by weight |

Example 31: Two-Stage Precipitation of PA 1012

Example 29 is repeated with the following changes:

Nucleation time: 120 minutes

Bulk density: 530 g/l

| Sieve analysis: | <32 μm: | 0.3% by weight |
|---|---|---|
| | <100 μm: | 28.4% by weight |
| | <250 μm: | 99.8% by weight |

Example 32: Two-Stage Production of PA 1212

In accordance with Example 10, 400 kg of a PA 1212 granular sample, obtained by polycondensation of 1,12-dodecanediamine and dodecanedioic acid and having the following characteristics: $\eta_{rel}$=1.80, [COOH]3 mmol/kg, [NH$_2$]107 mmol/kg are precipitated.

The precipitation conditions are modified relative to Example 10 as follows:

Dissolution temperature: 155° C., nucleation temperature: 123° C., nucleation time: 60 minutes, precipitation temperature: 117° C., precipitation time: 60 minutes, stirrer speed: 110 rpm Bulk density: 480 g/l

| Sieve analysis: | <32 μm: | 1.3% by weight |
|---|---|---|
| | <100 μm: | 56.6% by weight |
| | <250 μm: | 99.8% by weight |

| Variations in the preparation of unregulated PA 12: influence of stirrer speed | | | | | Dissolution phase for all Example 145° C./60 min | | |
|---|---|---|---|---|---|---|---|
| Example | Nucleation temp. ° C. | Nucleation time min | Precipitation temp. ° C. | Speed rpm | Bulk density g/l | Breadth D(0.9)-D(0.1) μm | Mean value of the particle size spectrum μm |
| 10 | 117 | 60 | 111 | 49 | 486 | 80.11 | 87.51 |
| 11 | 117 | 60 | 111 | 45 | 445 | 89.76 | 95.41 |
| 12 | 117 | 60 | 111 | 41 | 465 | 111.43 | 108.83 |
| 13 | 117 | 60 | 111 | 42 | 456 | 110.36 | 106.81 |

| Temperature variations in the precipitation of unregulated PA 12 | | | | | Dissolution phase for all Example 140° C./60 min | | |
|---|---|---|---|---|---|---|---|
| Example | Nucleation temp. ° C. | Nucleation time min | Precipitation temp. ° C. | Speed rpm | BET $m^2/g$ | Bulk density g/l | Particle size spectrum < 10/50/90% |
| 14 | 119 | 60 | 108 | 54 | 2.40 | | 45/95/139 |
| 15 | 119 | 60 | 110 | 54 | 1.97 | 486 | 41/85/126 |
| 16 | 119 | 60 | 112 | 54 | 4.73 | 448 | 36/62/90 |
| 17 | 119 | 60 | 113 | 54 | 5.70 | 420 | 33/58/85 |
| 18 | 119 | 60 | 113 | 54 | 5.83 | 420 | 30/57/84 |
| 19 | 119 | 60 | 113 | 54 | | 411 | 29/56/82 |
| 20 | 117 | 60 | 113 | 54 | 6.69 | 408 | 28/54/78 |
| 21 | 117 | 60 | 113 | 54 | | 413 | 30/55/81 |
| 22 | 117 | 60 | 113 | 54 | | 412 | 29/53/78 |
| 23 | 117 | 60 | 112 | 54 | 5.87 | 424 | 39/63/90 |
| 24 | 117 | 60 | 112 | 54 | 5.64 | 415 | 37/62/91 |
| 25 | 117 | 60 | 112 | 54 | | 429 | 32/59/88 |
| 26 | 116 | 60 | 113 | 54 | 6.73 | 417 | 29/55/83 |
| 27 | 116 | 60 | 113 | 54 | 7.99 | 404 | 26/53/83 |

This application is based on German patent application 197 08 946.1 filed in the German Patent Office on Mar. 5, 1997, the entire contents of which are hereby incorporated by reference.

We claim:

1. A process for preparing precipitated polyamide powder of narrow particle size distribution and low porosity, comprising:
   i) dissolving a polyamide in an aliphatic $C_{1-3}$ alcohol under pressure;
   ii) lowering the temperature in a first stage until nucleation takes place without precipitation;
   iii) lowering the temperature further in a second stage until supersaturation results;
   iv) precipitating said polyamide powder; and
   v) drying a resulting suspension.

2. The process of claim 1, wherein said $C_{1-3}$ alcohol is ethanol, said polyamide is dissolved at from 130 to 165° C. and precipitation is carried out isothermally at a precipitation temperature of from 100 to 130° C. preceded by a nucleation stage at from 2 to 20° C. above said precipitation temperature.

3. The process of claim 1, wherein said polyamide is dissolved at from 135 to 155° C.

4. The process of claim 1, wherein nucleation is at from 5 to 15° C. above said precipitation temperature.

5. The process of claim 1, wherein said temperature during nucleation is held constant for from 10 minutes to 2 hours.

6. The process of claim 1, wherein said temperature during nucleation is held constant for from 30 to 90 minutes.

7. The process of claim 1, wherein said polyamide is polylaurolactam.

8. The process of claim 1, wherein said powder has an upper particle size limit 100 μm, a fraction of at least 90% below 90 μm and not more than 10% below 32 μm and a bulk density of more than 400 g/l and/or a BET surface area of less than 10 $m^2/g$.

9. The process of claim 1, wherein said polyamide is formed from lactams or from ω-amino carboxylic acids having at least 10 C atoms or from diamines and dicarboxylic acids each having at least 10 C atoms or copolyamides of these monomers.

10. A polyamide powder prepared by a process comprising:
   i) dissolving a polyamide in an aliphatic $C_{1-3}$ alcohol under pressure;
   ii) lowering the temperature until nucleation takes place without precipitation;
   iii) lowering the temperature further in a second stage until supersaturation results;
   iv) precipitating said polyamide powder; and
   v) drying a resulting suspension.

11. A method of electrostatic spray coating comprising applying a composition comprising the polyamide powder of claim 10.

12. A method of coating metal by a fluidized-bed technique comprising applying a composition comprising the polyamide powder of claim 10.

13. A method of coil coating comprising applying a composition comprising the polyamide powder of claim 10.

* * * * *